United States Patent
Lee et al.

(10) Patent No.: US 9,336,182 B2
(45) Date of Patent: May 10, 2016

(54) APPARATUS AND METHOD FOR CONTROLLING A DATA-BASED BIPED

(75) Inventors: Yoonsang Lee, Seoul (KR); Jehee Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 424 days.

(21) Appl. No.: 13/808,784

(22) PCT Filed: Jul. 27, 2010

(86) PCT No.: PCT/KR2010/004943
§ 371 (c)(1),
(2), (4) Date: Apr. 25, 2013

(87) PCT Pub. No.: WO2012/008640
PCT Pub. Date: Jan. 19, 2012

(65) Prior Publication Data
US 2013/0211586 A1    Aug. 15, 2013

(30) Foreign Application Priority Data
Jul. 14, 2010 (KR) ........................ 10-2010-0068103

(51) Int. Cl.
G06F 19/00 (2011.01)
G06F 17/00 (2006.01)
B62D 57/032 (2006.01)

(52) U.S. Cl.
CPC ............. *G06F 17/00* (2013.01); *B62D 57/032* (2013.01); *Y10S 901/01* (2013.01)

(58) Field of Classification Search
CPC .............................. G06F 17/00; B62D 57/032
USPC .................... 700/245, 248, 250, 252
See application file for complete search history.

(56) References Cited

U.S. PATENT DOCUMENTS

| | | | | |
|---|---|---|---|---|
| 5,337,235 A * | 8/1994 | Takahashi | ............ | B62D 57/032 180/8.1 |
| 5,808,433 A * | 9/1998 | Tagami | ................ | B62D 57/032 180/8.6 |
| 5,936,367 A * | 8/1999 | Takenaka | ............... | B62D 57/02 180/8.6 |
| 6,301,524 B1 * | 10/2001 | Takenaka | ............... | B62D 57/02 318/568.12 |
| 2002/0022907 A1 * | 2/2002 | Takenaka | ............... | B62D 57/02 700/245 |
| 2004/0143369 A1 * | 7/2004 | Takenaka | ............. | B62D 57/032 700/245 |
| 2004/0164697 A1 * | 8/2004 | Iribe | ..................... | B25J 13/088 318/568.12 |
| 2004/0167641 A1 * | 8/2004 | Kawai | ................... | A61B 5/1038 700/63 |
| 2005/0021176 A1 * | 1/2005 | Takenaka | ............. | B62D 57/032 700/245 |
| 2005/0038560 A1 * | 2/2005 | Nagasaka | ............ | B62D 57/032 700/245 |
| 2005/0104548 A1 * | 5/2005 | Takenaka | ............. | B62D 57/032 318/568.12 |
| 2005/0107916 A1 * | 5/2005 | Nagasaka | ............ | B62D 57/032 700/245 |
| 2005/0110448 A1 * | 5/2005 | Takenaka | ............. | B62D 57/032 318/568.12 |

(Continued)

FOREIGN PATENT DOCUMENTS

| | | |
|---|---|---|
| JP | 2008200813 | 9/2005 |
| JP | 2006142465 | 6/2006 |
| KR | 1020037013471 | 3/2004 |

*Primary Examiner* — Ian Jen
(74) *Attorney, Agent, or Firm* — Boyle Fredrickson S.C.

(57) ABSTRACT

The invention relates to controlling a biped. In the biped control, target pose information for tracking control is provided by an animation engine, and/or is generated by modulating the reference pose information acquired from video capture data. In modulating such reference pose information, the current pose information can be fed back and used.

16 Claims, 14 Drawing Sheets

(56) References Cited

U.S. PATENT DOCUMENTS

| | | | |
|---|---|---|---|
| 2005/0113973 A1 | 5/2005 | Endo et al. | |
| 2005/0151497 A1* | 7/2005 | Nagasaka | B62D 57/032 318/568.12 |
| 2005/0240307 A1* | 10/2005 | Kuroki | B25J 13/085 700/245 |
| 2006/0106495 A1* | 5/2006 | Takenaka | B62D 57/032 700/253 |
| 2006/0173578 A1* | 8/2006 | Takenaka | B62D 57/032 700/245 |
| 2006/0247800 A1* | 11/2006 | Takenaka | B62D 57/032 700/54 |
| 2007/0168080 A1* | 7/2007 | Takenaka | B62D 57/032 700/245 |
| 2007/0185618 A1* | 8/2007 | Nagasaka | B62D 57/032 700/245 |
| 2007/0220637 A1* | 9/2007 | Endo | B25J 9/161 318/568.17 |
| 2008/0300721 A1* | 12/2008 | Takenaka | B62D 57/032 700/253 |
| 2009/0069940 A1* | 3/2009 | Honda | B25J 5/00 700/258 |
| 2009/0099689 A1* | 4/2009 | Takenaka | B62D 57/032 700/245 |
| 2009/0132087 A1* | 5/2009 | Pratt | B62D 57/032 700/258 |
| 2009/0187275 A1* | 7/2009 | Suga | B62D 57/032 700/245 |
| 2010/0017028 A1* | 1/2010 | Suga | B62D 57/032 700/245 |
| 2010/0113980 A1* | 5/2010 | Herr | A61F 2/60 600/587 |
| 2010/0161118 A1* | 6/2010 | Kwak | B62D 57/032 700/245 |
| 2010/0161131 A1* | 6/2010 | Goswami | B62D 57/032 700/263 |

* cited by examiner

APPARATUS AND METHOD FOR CONTROLLING A DATA-BASED BIPED

TECHNICAL FIELD

The present invention relates to a data-driven biped control apparatus and method, and more particularly, to a data-driven biped control apparatus and method for a biped robot control, and/or a simulation of an operation of a biped character, hereinafter simply referred to as a "biped."

BACKGROUND ART

Controlling a motion of a biped character in a physically-simulated virtual reality is an important issue in the fields of computer animation, robotics, and biomechanics.

In order to control a motion of a biped robot and/or a motion of a biped character to be simulated, controllers for physically simulating individual human behaviors, for example, walking and balancing, have been introduced in a control theory and machine learning.

One of such method is a method of tracking and controlling with respect to motion data acquired by capturing human motions, and simulating the motion of the biped based on the motion data.

However, when the motion capture data is simply tracked and controlled, the biped may easily lose balance and tumble over, due to discrepancies in weight, height, and the like between an actor from which motions are captured and the biped, an error in measurement, an error in tracking, and external disturbances of the biped. Here, the external disturbances may include, for example, an obstacle present in a direction in which the biped moves, a physical disturbance applied directly to the biped, a change in inclination of the ground, a shaking of the ground, and the like.

DISCLOSURE OF INVENTION

Technical Goals

An aspect of the present invention provides a data-driven biped control apparatus and method that may increase a reliability of balancing maintenance of a biped, despite various simulating environments or physical disturbances.

Another aspect of the present invention also provides a data-driven biped control apparatus and method that may be combined with various animation engines in a plug-in form, by omitting a separate pre-computation for processing reference motion data.

Technical Solutions

According to an aspect of the present invention, there is provided a data-driven biped control apparatus, including a balancing maintenance module to generate target pose information to be tracked subsequently, by modulating reference pose information based on current pose information of a biped to be fed back, and a synchronization module to edit a trajectory according to a time flow of at least one partial element included in the reference pose information, based on the current pose information.

Here, the target pose information may correspond to at least one of a stance hip, a swing hip, a stance ankle, and a swing foot height of the biped.

When the target pose information of the biped corresponds to a stance hip of the biped, the balancing maintenance module may compute a stance hip angle of the target pose information, by modulating a stance hip angle of the reference pose information, based on a difference between a stance hip angle of the current pose information and the stance hip angle of the reference pose information.

When the target pose information of the biped corresponds to at least one of a swing hip and a stance ankle angle of the biped, the balancing maintenance module may compute at least one of a swing hip angle and a stance ankle angle of the target pose information, by modulating at least one of a swing hip angle and a stance ankle angle of the reference pose information, based on a difference between a velocity of a biped center of the current pose information and a velocity of a biped center of the reference pose information.

In addition, in this instance, the balancing maintenance module may compute at least one of a swing hip angle and a stance ankle angle of the target pose information, by modulating at least one of a swing hip angle and a stance ankle angle of the reference pose information, based on a difference between a distance from a biped center to a stance ankle of the current pose information and a distance from a biped center to a stance ankle of the reference pose information.

When the target pose information of the biped corresponds to a swing foot height of the biped, the balancing maintenance module may compute a swing foot height of the target pose information, by modulating a swing foot height of the reference pose information, based on a difference between a swing foot height of the current pose information and the swing foot height of the reference pose information.

In addition, in this instance, the balancing maintenance module may compute a swing foot height of the target pose information, by modulating a swing foot height of the reference pose information, based on a difference between a change speed of a swing foot height of the current pose information and a change speed of the swing foot height of the reference pose information.

The synchronization module may edit the trajectory of the reference pose information by cutting off a portion of the trajectory of the reference pose information, when a swing foot landing of the current pose information of the biped is performed earlier than a swing foot landing of the reference pose information.

In this instance, the synchronization module may delete at least one frame of the reference pose information.

The synchronization module may edit the trajectory of the reference pose information, by inserting a surplus trajectory into the trajectory of the reference pose information, when a swing foot landing of the current pose information of the biped is performed later than a swing foot landing of the reference pose information.

In this instance, the synchronization module may add at least one frame to the reference pose information, when a swing foot landing of the current pose information of the biped is performed later than a swing foot landing of the reference pose information.

According to another aspect of the present invention, there is also provided a data-driven biped control apparatus, including a balancing maintenance module to generate target pose information to be tracked subsequently, by modulating reference pose information, based on current pose information of a biped to be fed back. Here, the balancing maintenance module may generate the target pose information to be tracked subsequently, by modulating the reference pose information corresponding to at least one of a stance hip, a swing hip, a stance ankle, and a swing foot height of the biped, based on the current pose information of the biped.

According to still another aspect of the present invention, there is also provided a data-driven biped control apparatus, including a synchronization module to edit a trajectory according to a time flow of at least a partial element included in reference pose information, based on current pose information of a biped to be fed back. Here, the synchronization module may edit the trajectory of the reference pose information, by cutting off a portion of the trajectory of the reference pose information, when a swing foot landing of the current pose information of the biped is performed earlier than a swing foot landing of the reference pose information, or inserting a surplus trajectory into the trajectory of the reference pose information, when the swing foot landing of the current pose information of the biped is performed later than the swing foot landing of the reference pose information.

According to yet another aspect of the present invention, there is also provided a data-driven biped control method, including generating, by a balancing maintenance module of a biped control apparatus, target pose information to be tracked subsequently, by modulating reference pose information, based on current pose information of a biped to be fed back, and editing, by a synchronization module of the biped control apparatus, a trajectory according to a time flow of at least a partial element included in the reference pose information, based on the current pose information.

Advantageous Effects

According to embodiments of the present invention, a control process for balancing maintenance of a biped may be performed without a complex pre-computation or model learning.

According to embodiments of the present invention, since a separate pre-computation may be unnecessary for balancing maintenance of a biped, any module capable of feeding reference motion data may be combined and thus, and various animation engines may be used originally in a plug-in form.

BEST MODE FOR CARRYING OUT THE INVENTION

Figure 1:
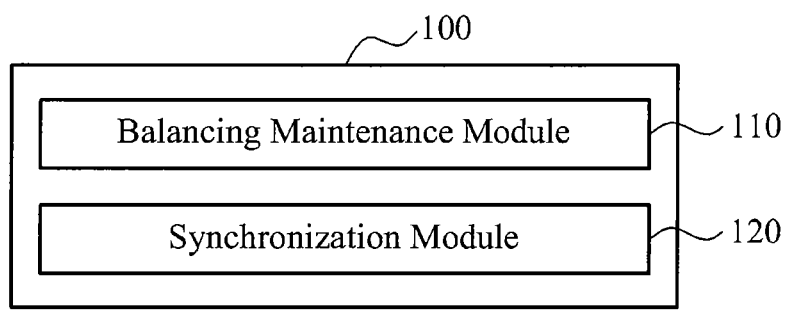
FIG. 1 illustrates a data-driven biped control apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a data-driven biped control apparatus 100 according to an embodiment of the present invention.

Referring to FIG. 1, the apparatus 100 may include a balancing maintenance module 110, and a synchronization module 120.

The balancing maintenance module 110 may modulate a stream of reference poses constituting reference motion data, continuously.

In particular, the modulating of the stream of the reference poses may be performed in real time while a current biped pose is fed back at a runtime of a biped motion simulation using tracking control and thus, may be applied rapidly without a pre-computation.

The synchronization module 120 may remove a partial pose stream of the reference motion data, and/or insert a partial pose stream additionally, in order to remove a ground landing error of a swing foot during a simulation of a walking motion of a biped, thereby performing synchronization between the reference motion data and a motion of the biped to be simulated.

The stream of the motion poses modulated at the runtime in real time by the balancing maintenance module 110 and the synchronization module 120 may be fed into a tracking controller to perform tracking control, and biped simulation may be performed by a simulator.

In a detailed simulation environment, the biped may not simply follow the original reference motion data. Instead, a current biped pose may be fed back in real time such that the reference motion data may be modulated continuously. Accordingly, a probability of balancing maintenance failure occurring for the biped may be greatly reduced.

A detailed operation of the balancing maintenance module 110 will be further described with reference to FIGS. 5 through 7, and a detailed operation of the synchronization module 120 will be further described with reference to FIGS. 8 through 11.

Figure 2:
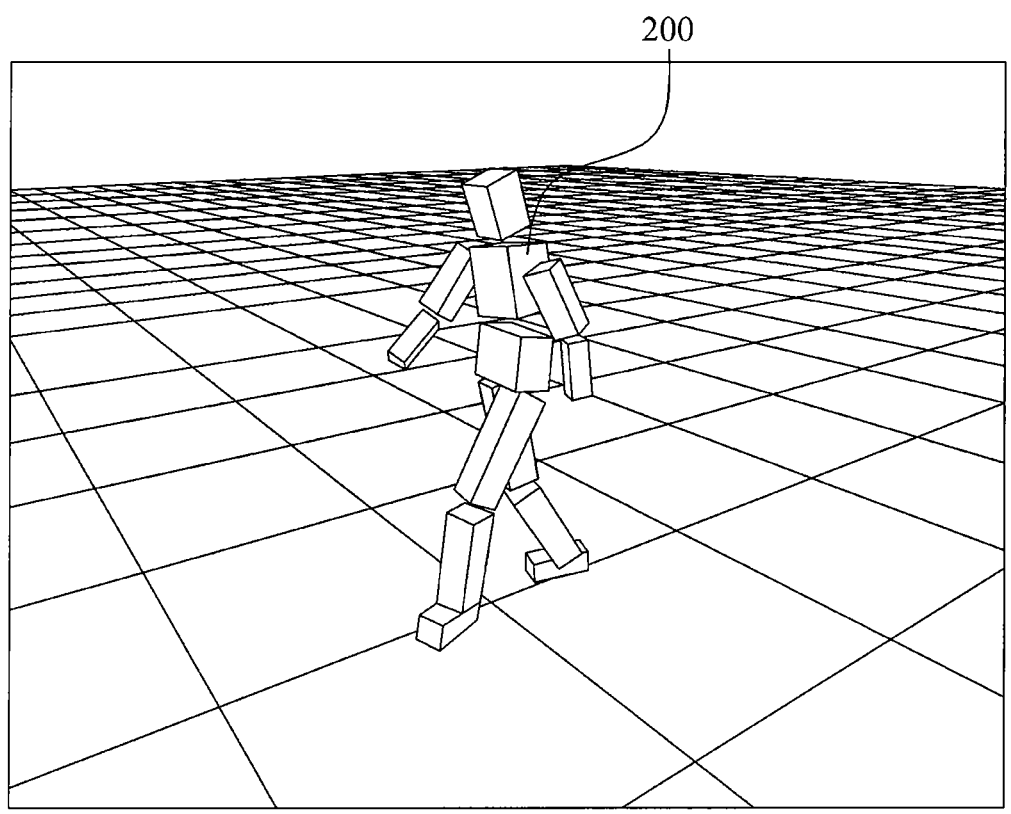
FIG. 2 illustrates an example of a biped controlled by a data-driven biped control apparatus 100 according to an embodiment of the present invention.

FIG. 2 illustrates an example of a biped 200 controlled by the data-driven biped control apparatus 100 of FIG. 1 according to an embodiment of the present invention.

The biped 200 may refer to a bipedal character, and may be used for simulating motions in a computing system, and/or controlling a motion of a real walking robot in robotics.

The biped 200 may include a plurality of rigid body parts, for example, a head, a torso, a pelvis, upper arms, lower arms, thighs, shins, and feet, connected by ball-and-socket joints.

Due to such a characteristic of the biped, issues on the biped simulation and control may result in an issue of torque occurring at a plurality of joints.

Here, the biped may correspond to a model simplified from a human body, and may have a significantly low Degree of Freedom (DOF). The simulation of the biped may be represented by a method of maintaining a balance of the biped 200, and a method of enabling the biped 200 to perform a natural motion, in a desired simulation environment.

The biped control will be described in detail with reference to FIG. 3.

Figure 3:
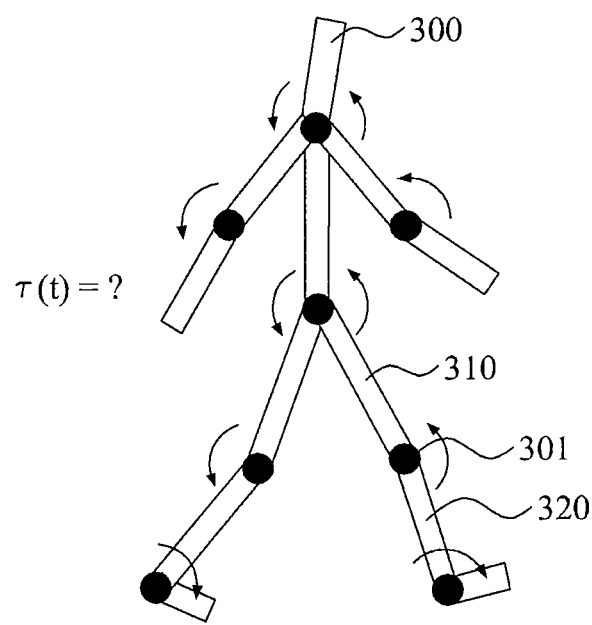
FIG. 3 is an overview to describe a data-driven biped control method according to an embodiment of the present invention.

FIG. 3 is an overview to describe a data-driven biped control method according to an embodiment of the present invention.

A biped 300 may be a two-dimensional (2D) plane of the biped 200 of FIG. 2. As shown in FIG. 3, a motion of the biped 300 may be implemented by a real-time control of torque values for each joint included in the biped.

A rigid body 320 and a rigid body 310 may be connected by a joint 301, and orientations or relative positions between the rigid body 320 and the rigid body 310 may be simulated by computing torque values at the joint 301.

An example of a method of controlling a motion of a biped model may be a method of controlling the motion of the biped model by tracking and controlling reference motion to be tracked.

$$\ddot{\theta}_{desired} = k_t(\theta_r - \theta) + k_v(\dot{\theta}_r - \dot{\theta}) + \ddot{\theta}_r$$ [Equation 1]

In Equation 1, $\theta_r$, $\dot{\theta}_r$, and $\ddot{\theta}_r$ denote joint angles, joint velocities, and joint accelerations, respectively, estimated from the reference motion $\theta$, and $\dot{\theta}$ denote joint angles and joint velocities of a current joint of the biped, respectively.

A torque at a joint may be computed from a desired joint acceleration $\ddot{\theta}_{desired}$ using inverse dynamics, and may be fed into a forward dynamics simulator to actuate the biped.

The computing of the torques for each joint of the biped and the actuating process of the simulator through tracking control may be implemented by various applications. Accordingly, without departing from the spirit of the invention, embodiments directed to controlling the actuating of the biped using reference motion data should not be construed as being excluded from the scope of the claims of the present invention.

In addition, there may be various applications with respect to a method of acquiring the reference motion data. The present invention should not be construed as being limited to the embodiments set forth herein, and the scope of the invention is defined by the appended claims.

Accordingly, when the reference motion data is tracked and controlled by the tracking control method to control and simulate the actuating of the biped, various types of tracking control methods, various types of animation engines feeding the reference motion data, and the like, various types of detailed actuating simulation methods, and the like may be employed, although such methods are not described below. The embodiments should be construed as being included in the scope of the present invention as defined by the following claims, without departing from the spirit of the present invention.

The balancing maintenance module 110 of the apparatus 100 of FIG. 1 may modulate a stream of reference poses constituting the reference motion data, continuously.

In particular, the modulating of the stream of the reference poses may be performed in real time while a current biped pose is fed back at a runtime of a biped motion simulation using tracking control and thus, may be applied rapidly without a pre-computation.

The stream of the motion poses modulated at the runtime in real time by the balancing maintenance module 110 may be fed into a tracking controller to perform tracking control, and biped simulation may be performed by a simulator.

In a detailed simulation environment, the biped may not simply follow the original reference motion data. Instead, a current biped pose may be fed back in real time such that the reference motion data may be modulated continuously. Accordingly, a balancing maintenance failure probability of the biped may be greatly reduced.

Here, a motion queue may be used during a real-time edition process of the reference motion data, and will be described with reference to FIG. 4.

Figure 4:
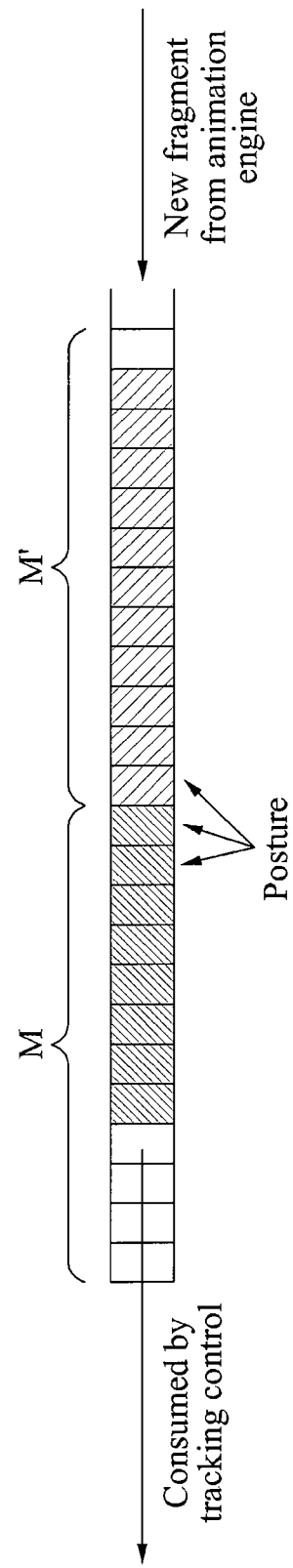
FIG. 4 is an overview illustrating an example of managing reference motion data in a motion queue according to an embodiment of the present invention.

FIG. 4 is an overview illustrating an example of managing reference motion data in a motion queue according to an embodiment of the present invention.

Referring to FIG. 4, motion data acquired from an animation engine or another source of reference motion data may be fragmented into change units of a swing foot, and the fragmented units may be classified and managed as postures corresponding to a plurality of frame poses.

For example, with respect to motion data units M, a left leg of a biped may correspond to a swing foot. With respect to motion data units M', a right leg of the biped may correspond to the swing foot. The motion data units M may be managed as a plurality of postures based on a frame rate.

The postures may be dequeued and used for tracking control according to a time flow. The balancing maintenance module 110 of FIG. 1 may receive a feedback of current pose information of the biped, and modulate the dequeued postures, hereinafter, reference poses.

According to another embodiment of the present invention, the synchronization module 120 of the apparatus 100 of FIG. 1 may remove or insert a partial reference pose stream of the reference motion data, in addition to the reference pose being modulated by the balancing maintenance module 110. In this instance, postures generated by dequeuing a portion of the postures simultaneously and/or integrating a portion of the postures may be enqueued.

Hereinafter, an operation of the balancing maintenance module 110 and an operation of the synchronization module 120 will be described along with detailed examples.

A brief description of balancing maintenance in human locomotion is provided here, in order to facilitate a better understanding of the biped motion control. A DOF of a human body is much higher than a DOF of the biped and thus, more factors contribute to balancing maintenance. However, basically, a human balance behavior heavily relies on a control of torque values at a number of joints, including hip joints and a stance ankle.

Accordingly, motion capture data acquired by capturing motions related to locomotion of a human actor may be tracked and controlled, whereby the motion of the biped may be simulated.

In addition, according to another embodiment of the present invention, reference motion data of a biped character, for example, a robot for a case of controlling a motion of the robot physically, according to a user interaction may be fed from a separate plug-in animation engine.

When the reference motion data to be tracked through tracking control is fed in any manner, the apparatus 100 may receive the feedback of the current pose information of the biped, and perform a motion data modulation using the current pose information at a runtime.

Information on the reference motion data may be understood based on the following Equation 2.

$$M(t)=(v_0*t), q_1(t), q_2(t), \ldots, q_n(t)) \quad \text{[Equation 2]}$$

where $0 \le t \le T$

In Equation 2, M(t) denotes a reference pose present at a top of the motion queue of FIG. 4, and to be referred to at a current point in time t. In particular, the reference pose M(t) may correspond to a single fragment representing a pose at a specific point in time, among motions.

$v_0 \in \mathbb{R}^3$ and $q_1 \in \mathbb{S}^3$ represent a root position and a root orientation of each biped, respectively, and $q_k \in \mathbb{S}^3$ for k>1 represents a relative orientation of a $k^{th}$ joint with respect to a parent link.

Accordingly, the single reference pose M(t) may correspond to a pose of the biped for one instance.

The balancing maintenance module 110 may modulate the reference pose M(t) at a run time, continuously.

However, only with the simply tracking control of the reference pose M(t) dequeued out of the motion queue, the biped balancing maintenance may easily fail. There may be various causes of the failure of the balancing maintenance.

For example, the balancing maintenance may fail since an environment in which motion data corresponding to a set of reference poses M(t) is acquired, or a factor during a modeling process may be in discord with an environment or a factor of the biped to be simulated actually.

In this example, the motion data may be acquired by motion capture. The causes of the failure of the balancing maintenance may include a case in which a height, a weight, a joint position, and the like of an actor from which motions are captured are in discord with a height, a weight, a joint position, and the like of the biped to be simulated. Here, such discrepancies may result from various causes, for example, an error in computation, an error in a measured value, and the like.

For example, motion data of a current frame may correspond to M(tc), and motion data of a subsequent frame may correspond to a reference pose M(tc+1). In this instance, when the reference pose M(tc+1) is simply fed into the tracking controller to perform tracking control, balancing maintenance in simulating the motion of the biped may fail relatively easily. Here, the failure of the balancing maintenance may include varied examples, for example, a case in which the biped tumbles over, a case in which the biped does not perform an accurate motion, and the like.

In addition, in a simulation environment, when an obstacle exists on the ground on which the biped walks, when an inclination of the ground is changed, when a flying object hits the biped, or when an unexpected physical disturbance, for example, a shaking of the ground, affects the simulation, the balancing maintenance of the biped may fail relatively easily.

Accordingly, the balancing maintenance module 110 may receive, from the simulator, the feedback of the current pose information P of the biped to be simulated, modulate the subsequent reference information M(tc+1), generate a target pose $\hat{P}$, and feed the generated target pose $\hat{P}$ to the tracking controller.

The tracking controller may track and control the target pose $\hat{P}$, and the simulator may perform the simulation of the biped.

In this manner, the balancing maintenance module 110 may modulate the reference pose information M(t) for every instance, and generate a stream of the target pose $\hat{P}$ at a runtime in real time. Accordingly, as described above, a pre-computation may be unnecessary before the runtime.

Figure 5:
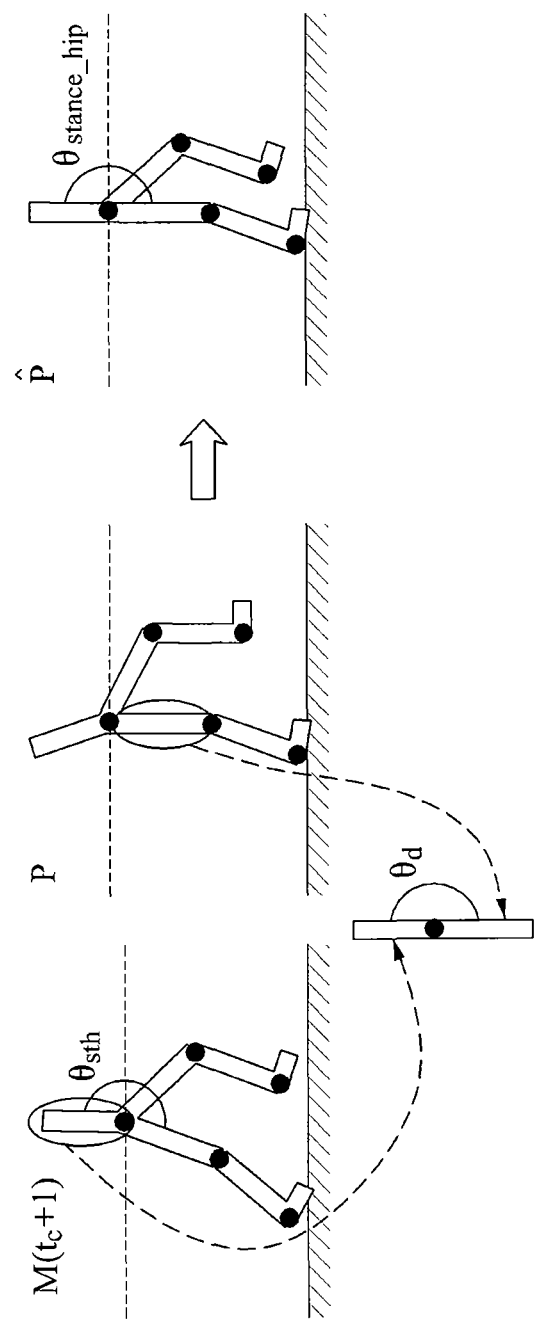
FIG. 5 illustrates a process of a balancing maintenance module computing a stance hip angle of a target pose through a feedback of current pose information according to an embodiment of the present invention.

FIG. 5 illustrates a process of the balancing maintenance module 110 of FIG. 1 computing a stance hip angle of a target pose $\hat{P}$ through a feedback of current pose information according to an embodiment of the present invention.

$$\theta_{stance\_hip} = \theta_{sth} + c_0(\theta_d - \theta_{sth})s(t) \quad \text{[Equation 3]}$$

The balancing maintenance module 110 may compute a stance hip angle $\theta_{stance\_hip}$ of the target pose $\hat{P}$, by modulating $\theta_{sth}$ to be tracked originally based on $\theta_d - \theta_{sth}$ corresponding to a difference between a stance hip angle of current pose information and a stance hip angle of reference pose information M(tc+1) to be tracked subsequently.

In Equation 3, $c_0$ denotes a constant for calibration, and s(t) denotes a function enabling a smooth transition without an abrupt change in pose.

Equation 3 may be rewritten using a relative orientation with respect to a parent link, as expressed by Equation 4. Accordingly, Equation 3 and Equation 4 may have the same meaning.

$$(q_{stance\_hip} = q_{sth}(q_{sth}^{-1}q_d)^{c_0 \cdot s(t)}) \quad \text{[Equation 4]}$$

Figure 6:
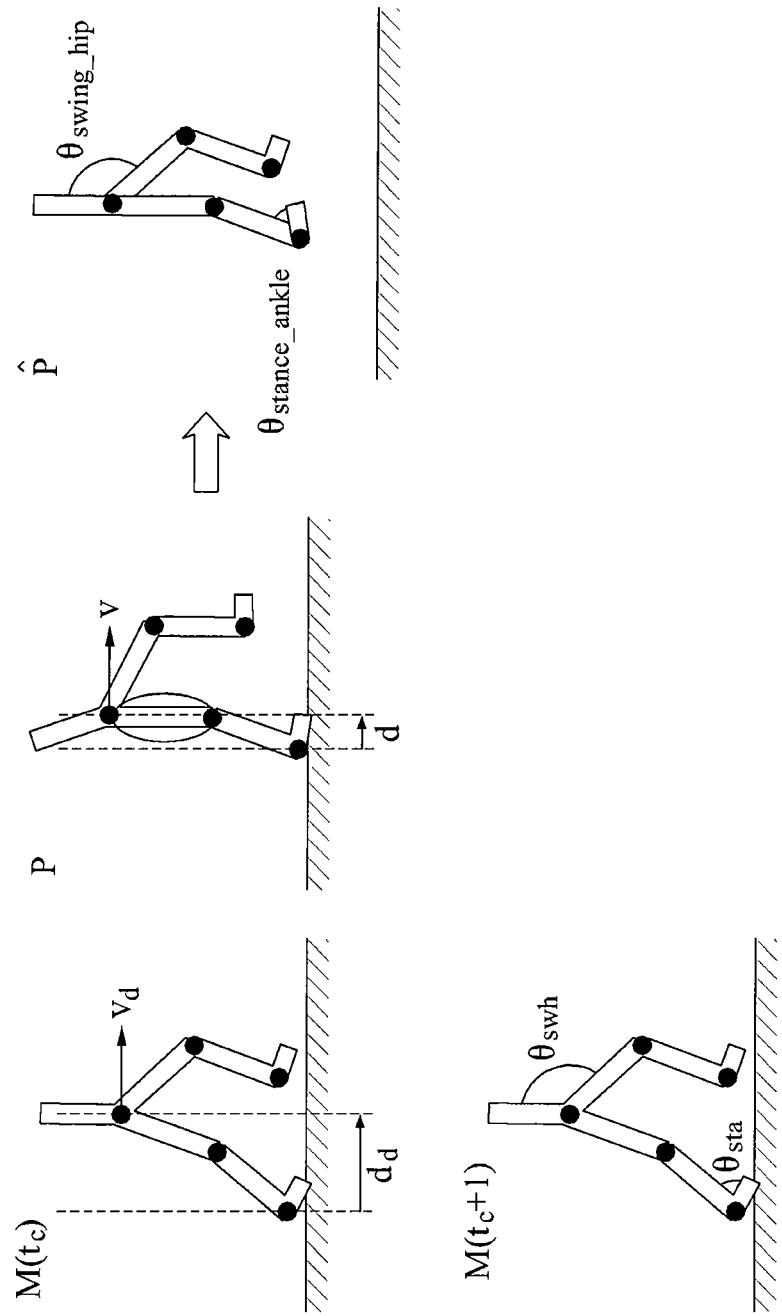
FIG. 6 illustrates a process of a balancing maintenance module computing a swing hip angle of a target pose through a feedback of current pose information according to an embodiment of the present invention.

FIG. 6 illustrates a process of the balancing maintenance module 110 of FIG. 1 computing a swing hip angle of a target pose $\hat{P}$ through a feedback of current pose information according to an embodiment of the present invention.

$$\theta_{swing\_hip} = \theta_{swh} + (c_1(v_d - v) + c_2(d_d - d))s(t) \quad \text{[Equation 5]}$$

Here, the balancing maintenance module 110 may compute a swing hip angle $\theta_{swing\_hip}$, by modulating $\theta_{swh}$ to be tracked originally based on $V_d - V$ corresponding to a velocity of a biped center of current pose information and a velocity of a biped center of reference pose information M(tc), and $d_d - d$ corresponding to a difference between a distance from a stance ankle to a biped center of the current pose information and a distance from a stance ankle to a biped center of the reference pose information.

That the biped may lean forward and be likely to lose balance ($d_d < d$) when a current speed is faster than a reference speed ($V_d < V$) may be applied to the feedback process.

FIG. 6 also illustrates a process of the balancing maintenance module 110 of FIG. 1 computing a stance ankle angle of a target pose $\hat{P}$ through a feedback of current pose information according to an embodiment of the present invention.

$$\theta_{stance\_ankle} = \theta_{sta} + (c_3(v_d - v) + c_4(d_d - d))s(t) \quad \text{[Equation 6]}$$

Equation 6 is identical to Equation 5, except that a stance ankle $\theta_{sta}$ to be tracked originally may be modulated through the feedback.

When the biped turns or spins, a Sagittal plane and a Coronal plane including a vector V and a vector d may be changed rapidly and thus, the balancing maintenance control may be difficult.

Accordingly, the balancing maintenance control may be performed using a vertical plane including the vector V, and another perpendicular vertical plane, in lieu of the Sagittal plane and the Coronal plane.

Figure 7:
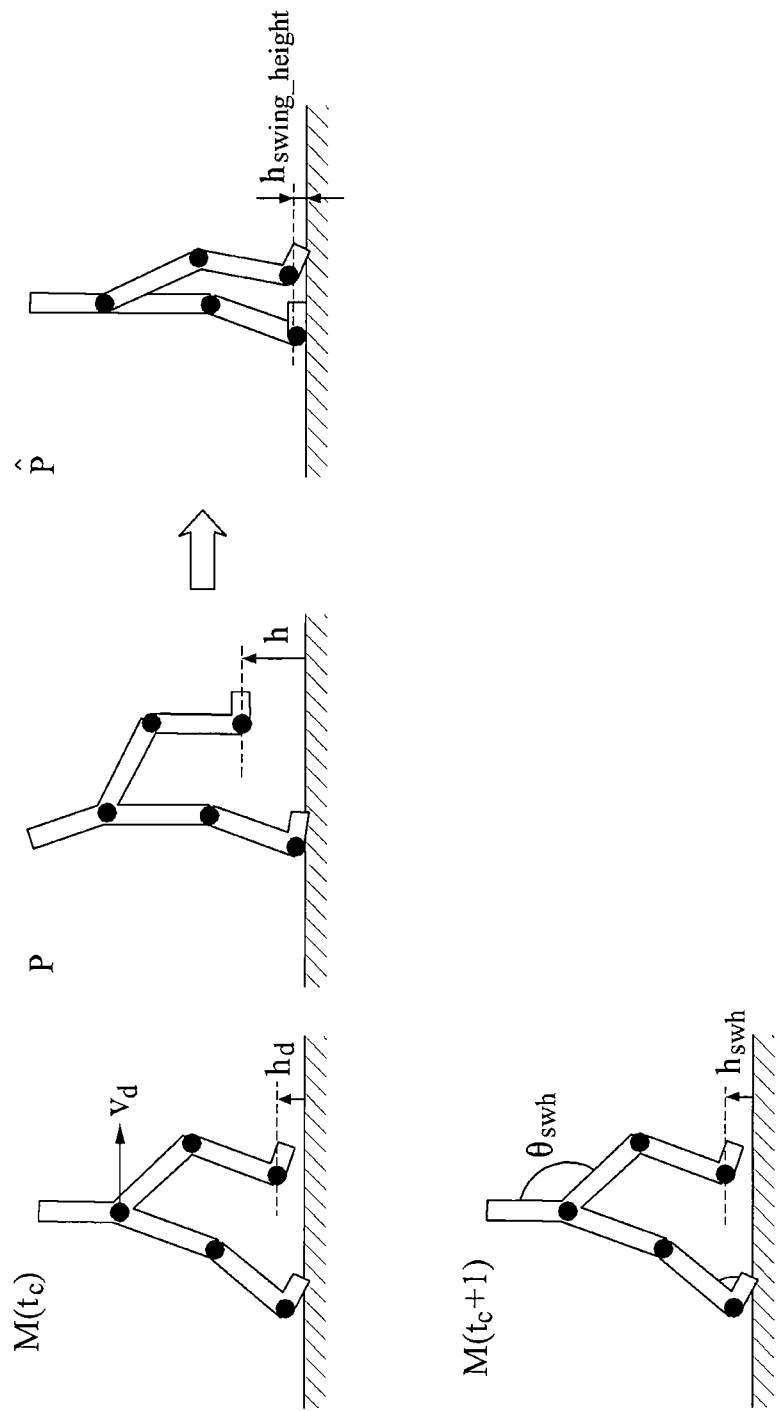
FIG. 7 illustrates a process of a balancing maintenance module computing a swing foot height of a target pose through a feedback of current pose information according to an embodiment of the present invention.

FIG. 7 illustrates a process of the balancing maintenance module 110 of FIG. 1 computing a swing foot height of a target pose $\hat{P}$ through a feedback of current pose information according to an embodiment of the present invention.

$$h_{swing\_height} = h_{swh} + (c_5(h_d - h) + c_6(\dot{h}_d - \dot{h}))s(t) \quad \text{[Equation 7]}$$

Equation 7 differs from the above equations in that a relative height with respect to a ground of a swing foot may be fed back, and also in that relative heights $h_d$ and h may be fed back together with a velocity in a vertical direction of the swing food corresponding to its differential value.

The detailed examples of the operation of the balancing maintenance module 110 have been described. Hereinafter, an operation of the synchronization module 120 of FIG. 1 will be described.

In synchronization, a swing foot at a current pose of a biped being simulated landing on the ground earlier than or later than expected from a reference pose may be considered.

The synchronization module 120 may synchronize the reference pose with the current pose, by correcting the early landing of the swing foot or the late landing of the swing foot to edit a partial stream of the reference pose.

Here, the editing may refer to removing a partial reference pose stream, for example, uniform dequeuing in a motion queue, or inserting a partial reference pose stream, for example, enqueuing into the motion queue, as described with reference to FIGS. 4, and the like.

The operation of the synchronization module 120 may be understood through Equation 8.

$$M(t) \leftarrow M'(t) \otimes (\hat{P} \oslash M'(0))^{r(t)} \text{ for } \forall t \quad \text{[Equation 8]}$$

In Equation 8, $\hat{P} \oslash M'(0)$ denotes a displacement between two poses $\hat{P}$ and $M'(0)$, and $r(t)$ denotes an attenuation function for a smooth transition.

The function $r(t)$ may include varied applications capable of seamlessly connecting the two poses. For example, the function $r(t)$ may be "1" at the beginning of $M'(t)$ and "0" at the end of $M'(t)$, and derivatives at both ends may be "0."

However, a method of applying the function $r(t)$ for the transition, and an angle of a transition target may be set to vary depending on a target to be fed back.

For example, in a case of a stance foot supporting the entire weight of the biped, balancing control of the entire biped may be difficult due to the function $r(t)$ for the smooth transition. In this instance, the transition may be decreased intentionally, when compared to other targets to be fed back, to enable a rapid motion change to be performed.

In addition, with respect to the stance foot, an angle with respect to the ground may be more important than the relative orientation with respect to the parent link. Accordingly, by controlling an angle of a stance foot of a reference motion with respect to the ground after the transition is performed to be identical to an angle of a stance foot of the reference motion with respect to the ground before the transition is performed, whereby the biped may be controlled more stably.

In a case of control of the stance ankle, $r(t)$ may be set differently from other targets to be fed back, for example, a swing hip, and the like. Hereinafter, unless otherwise mentioned, it may be understood that the transition function $r(t)$ may be set to vary depending on each target to be fed back for control performance improvement.

An operation of the synchronization module 120 for a case of an earlier landing at a current pose will be described in detail with reference to FIGS. 8 and 9, and an operation of the synchronization module 120 for a case of a later landing at a current pose will be described in detail with reference to FIGS. 10 and 11.

Figure 8:
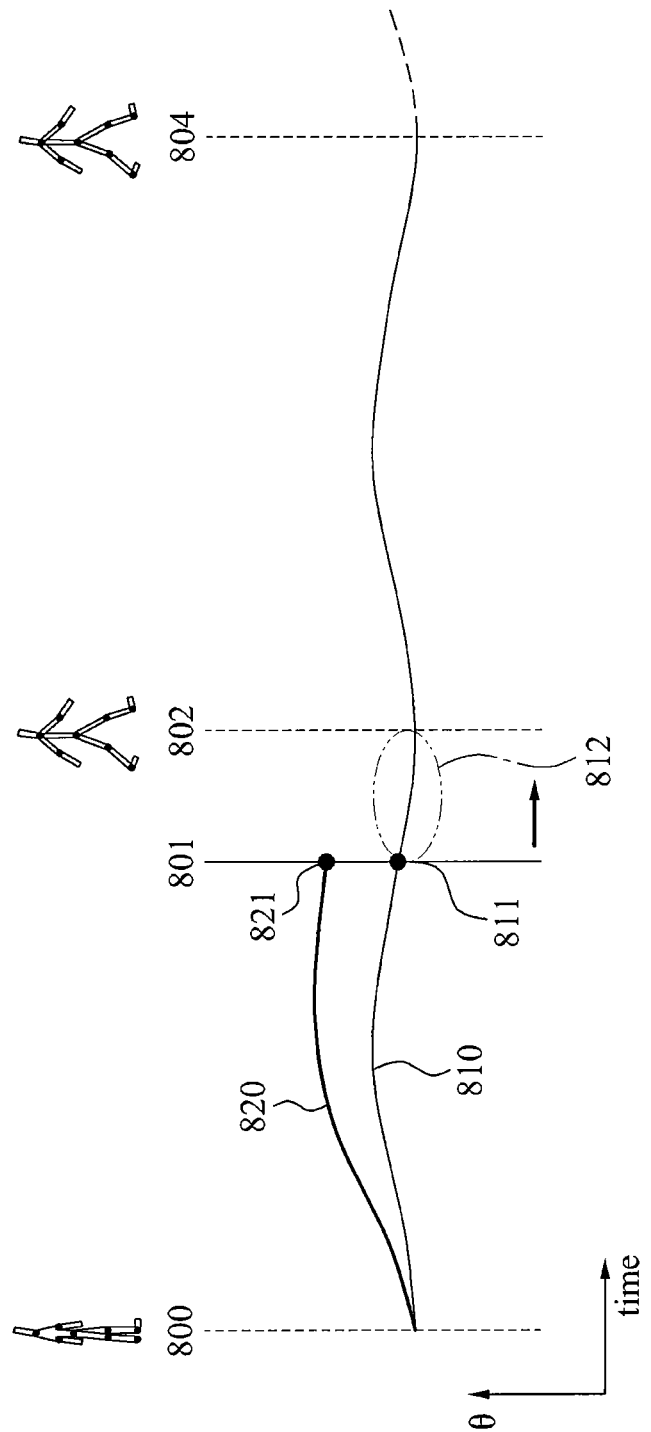
FIGS. 8 and 9 illustrate a process of a synchronization module editing reference pose information for synchronization in response to an earlier landing of a swing foot according to an embodiment of the present invention.
Figure 9:
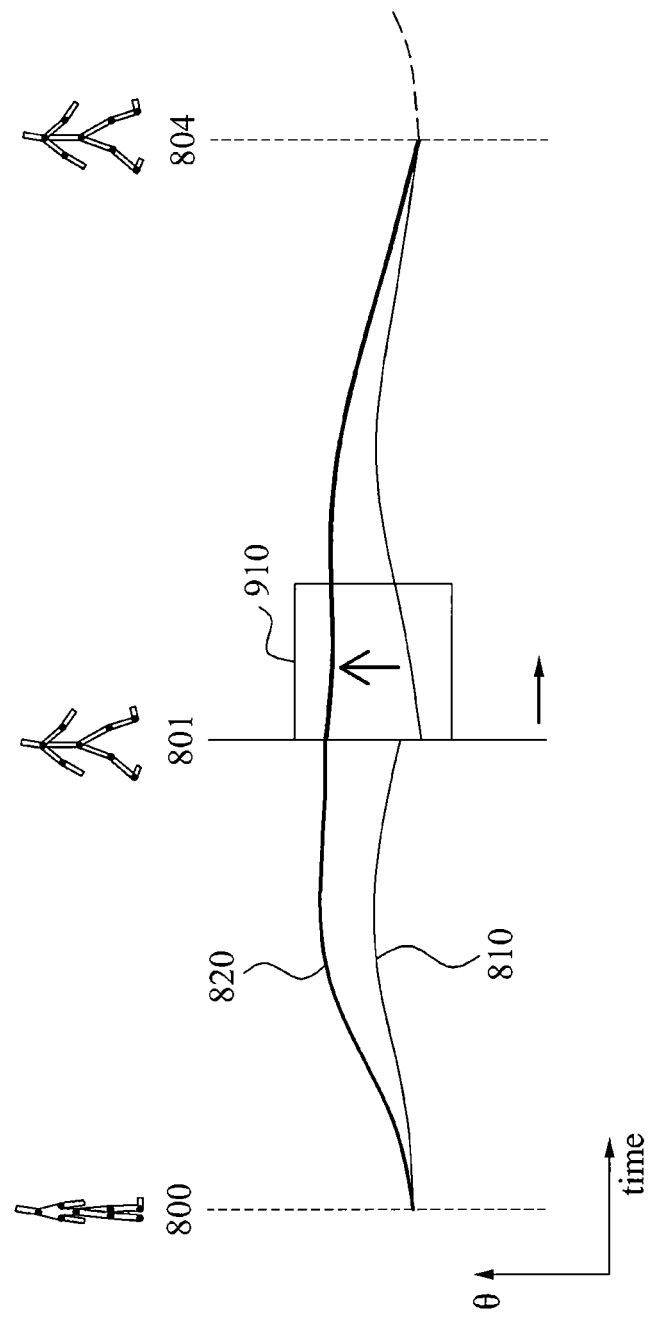

FIGS. 8 and 9 illustrate a process of the synchronization module 120 of FIG. 1 editing reference pose information for synchronization in response to an earlier landing of a swing foot according to an embodiment of the present invention.

During a simulation process, a swing foot of a biped to be simulated actually may be in contact with a ground at a posture M(tc) before all frame postures of a reference pose M(t) are dequeued.

In particular, since a swing foot of the reference pose M(t) lands before the beginning of frames of another pose M'(t), such an example may be referred to as an earlier landing of a swing foot.

In a case of such an earlier landing of a swing foot, a partial pose stream of reference motion data may be deleted in order to connect motions naturally without losing the balance of the biped.

The deleting of the partial pose stream may refer to dequeuing of a number of postures at the end of M(t) in a motion queue.

Referring to FIG. 8, an angle, for example, a swing hip angle, and the like, may be expressed as like a trajectory 810 according to a time flow.

The trajectory 810 may have a regular period, and a period may be distinguished by time lines, for example, points in time, 800, 802, and 804 on which original swing foot change occurs.

In a trajectory 820 of a target posture being computed and tracked by continuous feedback, an occurrence 821 of a landing of a swing foot at a point in time 801 earlier than the point in time 802 at which the original swing foot change occurs may be verified.

In this instance, the synchronization module 120 may cut off a trajectory between a point 811 and a point 812, and may put a reference pose after the swing foot change forward. This may be construed as deleting and moving a portion of the trajectory in an aspect of the trajectory, however, may be implemented by uniformly dequeuing a number of last postures included in M before the beginning of M' in the motion queue of FIG. 4 in reality.

In this instance, for a smooth transition without causing an abrupt change in a motion, another transition function may be applied to the trajectory for a seamless transition. The results are illustrated in a region 910 of FIG. 9.

The synchronization process in response to the earlier landing in a single swing foot change process has been described, and such description will be repeated to resolve the following issue in a repeated swing foot change process.

Figure 10:
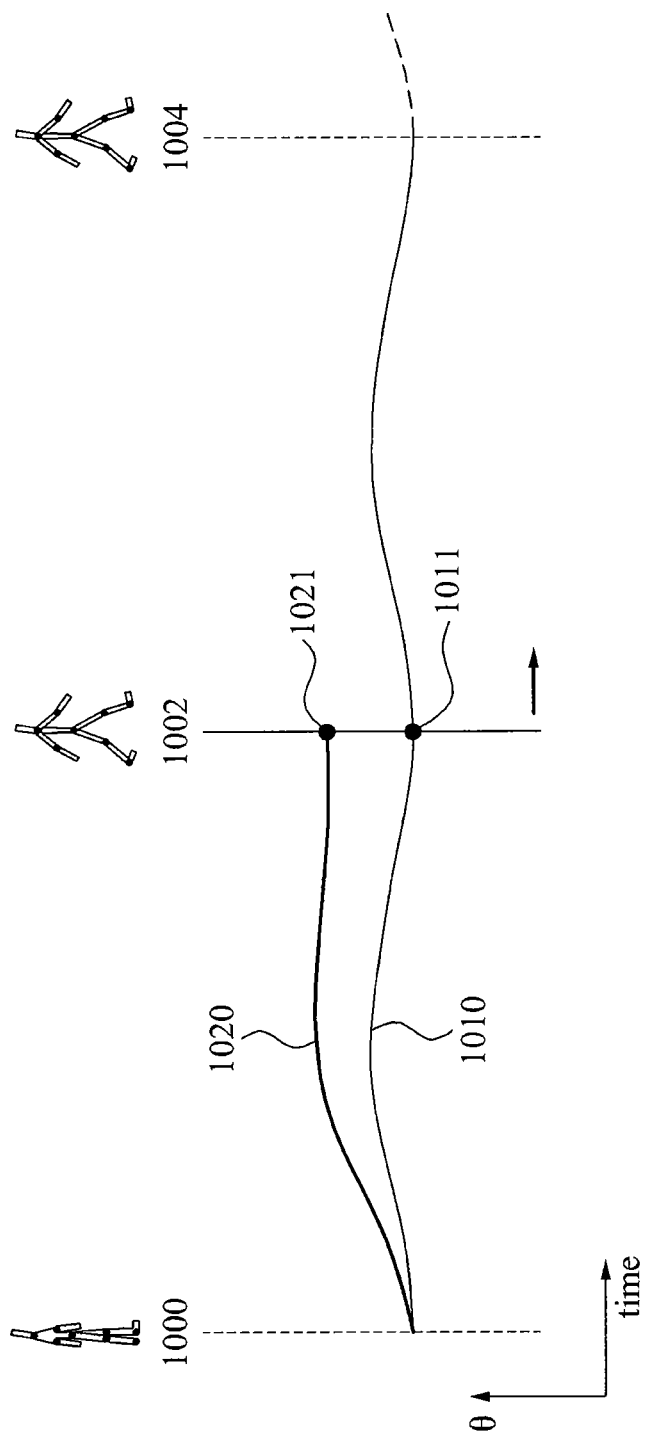
FIGS. 10 and 11 illustrate a process of a synchronization module editing reference pose information for synchronization in response to a later landing of a swing foot according to an embodiment of the present invention.
Figure 11:
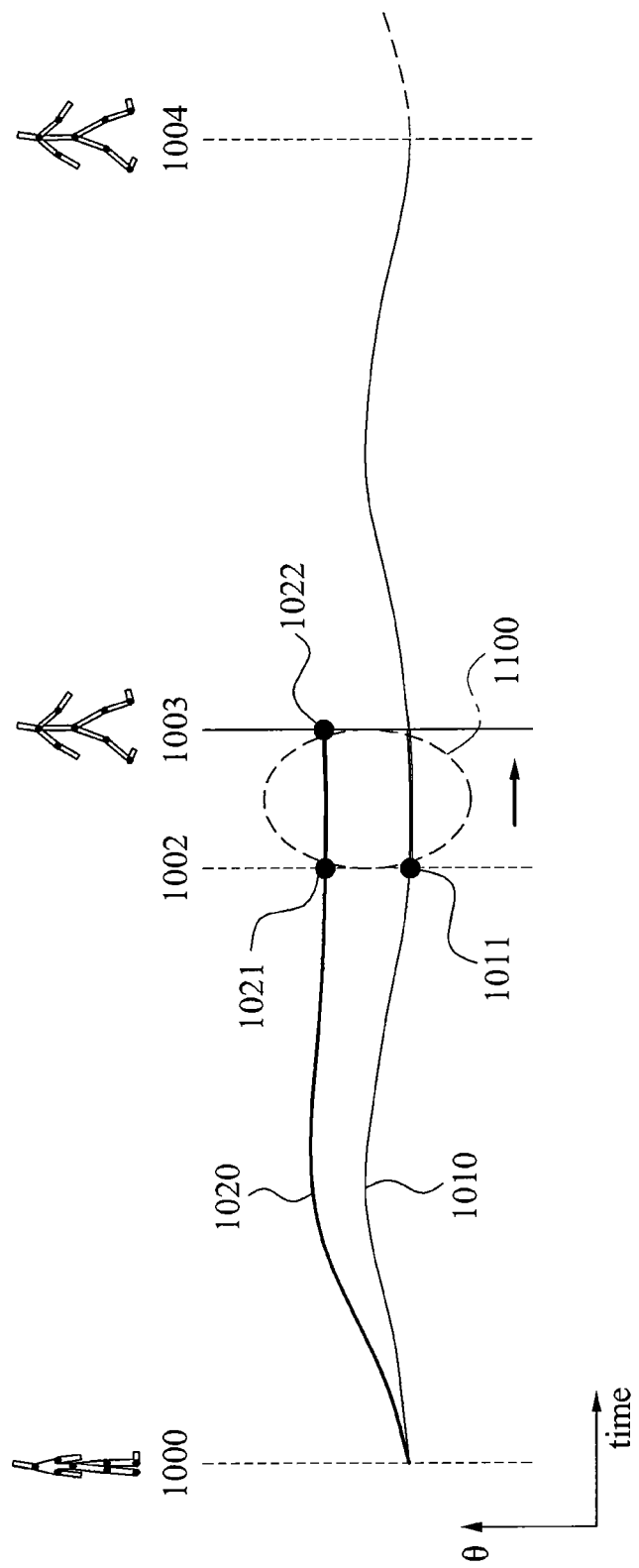

FIGS. 10 and 11 illustrate a process of the synchronization module 120 of FIG. 2 editing reference pose information for synchronization in response to a later landing of a swing foot according to an embodiment of the present invention.

Provided is an example in which a landing of a swing foot is yet to occur at a point 1021 in an angle trajectory 1020 of an actual target pose, although a swing foot change is to occur at original points in time 1000, 1002, and 1004 in an angle trajectory 1010 of a reference pose.

In this instance, the synchronization module 120 may cut off a point 1011 at which a swing foot change occurs in the trajectory 1010, put the point 1011 backward, and insert proper trajectory information between the space, thereby helping balancing maintenance of the biped.

Referring to FIG. 11, a surplus trajectory being inserted behind the point 1011, in a region 1100 is verified. This process may be performed by a proper method, for example, by integrating preceding trajectory information or angle information of a pose.

In particular, pose information not existing in reality may be generated by integrating each joint angle. Although the trajectory has been described with reference to FIGS. 10 and 11, the trajectory may be edited by enqueuing surplus postures into the motion queue of FIG. 4, in reality.

Figure 12:
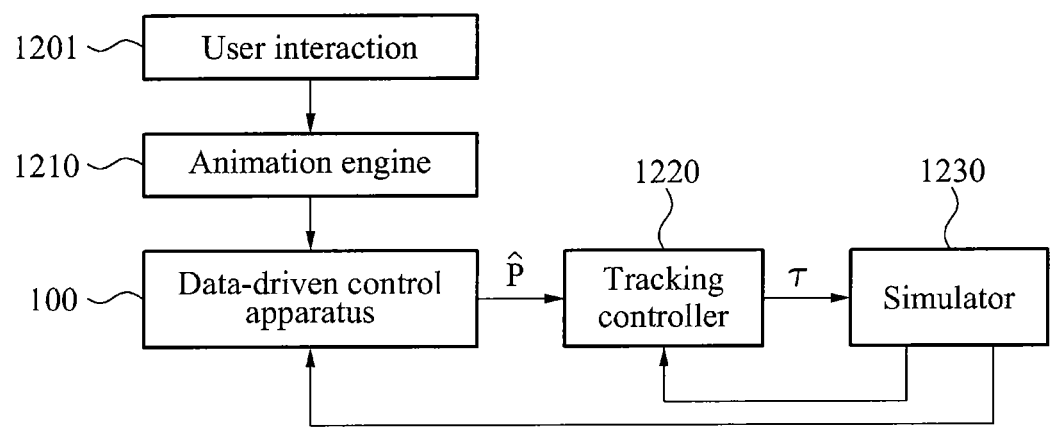
FIG. 12 is a system overview illustrating an entire flow of an operation of a data-driven biped control apparatus according to an embodiment of the present invention.

FIG. 12 is a system overview illustrating an entire flow of an operation of the data-driven biped control apparatus 100 of FIG. 1 according to an embodiment of the present invention.

Referring to FIG. 12, when a user interaction 1201 is received, an animation engine 1210 may transfer information on motion data to the apparatus 100.

In this instance, the transferred motion data may correspond to a reference pose stream corresponding to a plurality of frames. Otherwise, the apparatus 100 may generate the reference pose stream through sampling of the motion data.

The apparatus 100 may receive, from an actuator 1230, for example, a simulator, a feedback of current pose information of a biped being currently controlled, and modulate the reference pose stream in real time.

Here, the actuator 1230 may correspond to a biped joint actuator in a case of a physical biped robot control, and may correspond to a simulating controller in a case of computing simulation of a biped character. Herein, unless otherwise mentioned, the biped motion control or simulation should be construed as including a simulation of a biped character in a computing environment, and examples of controlling a motion of a real biped robot.

Such real-time modulation may correspond to the operation of the balancing maintenance module 110 and the operation of the synchronization module 120 of FIG. 1.

By the real-time modulation, target post information $\hat{P}$ may be fed into a tracking controller 1220, and the tracking controller 1220 may feed a torque $\mathcal{T}$ of each joint of the biped to the simulating controller 1230.

In addition, in this instance, the tracking controller 1220 may receive a feedback from the simulating controller 1230.

According to an embodiment of the present invention, a number of times a current pose is fed back to the tracking controller 1220 may be much greater than a number of times the current pose is fed back to the apparatus 100. For example, the former may correspond to a feedback at a level of 30 hertz (Hz), and the latter may correspond to a feedback at a level of 900 Hz.

Figure 13:
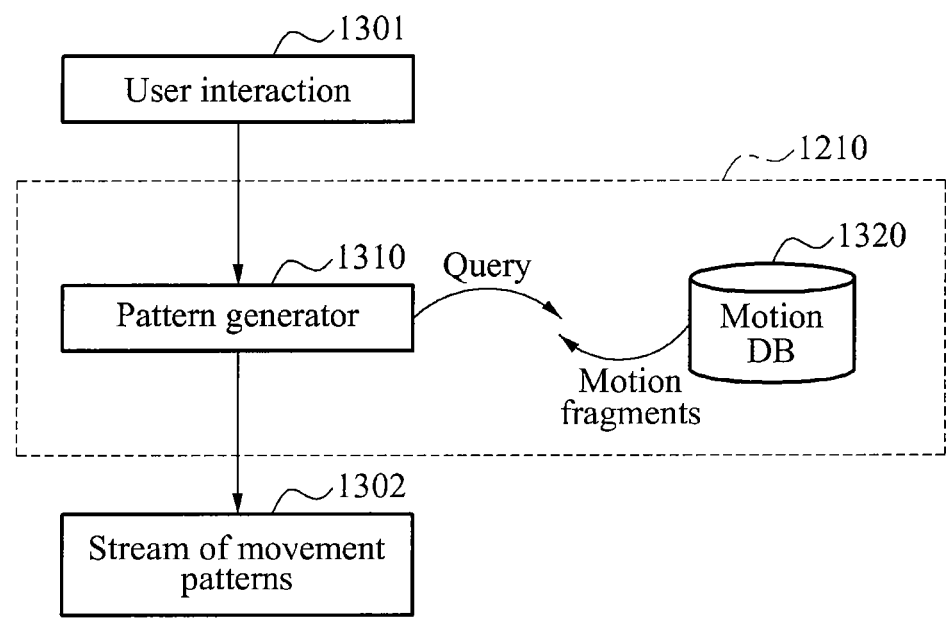
FIG. 13 is an overview illustrating a detailed operation of an animation engine of FIG. 12 capable of being combined with a data-driven biped control apparatus according to an embodiment of the present invention.

FIG. 13 is an overview illustrating a detailed operation of the animation engine 1210 of FIG. 12 capable of being combined with the data-driven biped control apparatus 100 of FIG. 1 according to an embodiment of the present invention.

The animation engine 1210 may include a pattern generator 1310. When a user interaction 1310, for example, a control instruction to control a biped character in a specific direction, or the like, is received, the pattern generator 1310 may direct a query to a motion database 1320, retrieve motion fragments from the motion database 1320, and fed the motion fragments to the apparatus 100 as a stream 1302 of movement patterns for the apparatus 100 to use the motion fragments as reference pose information.

Figure 14:
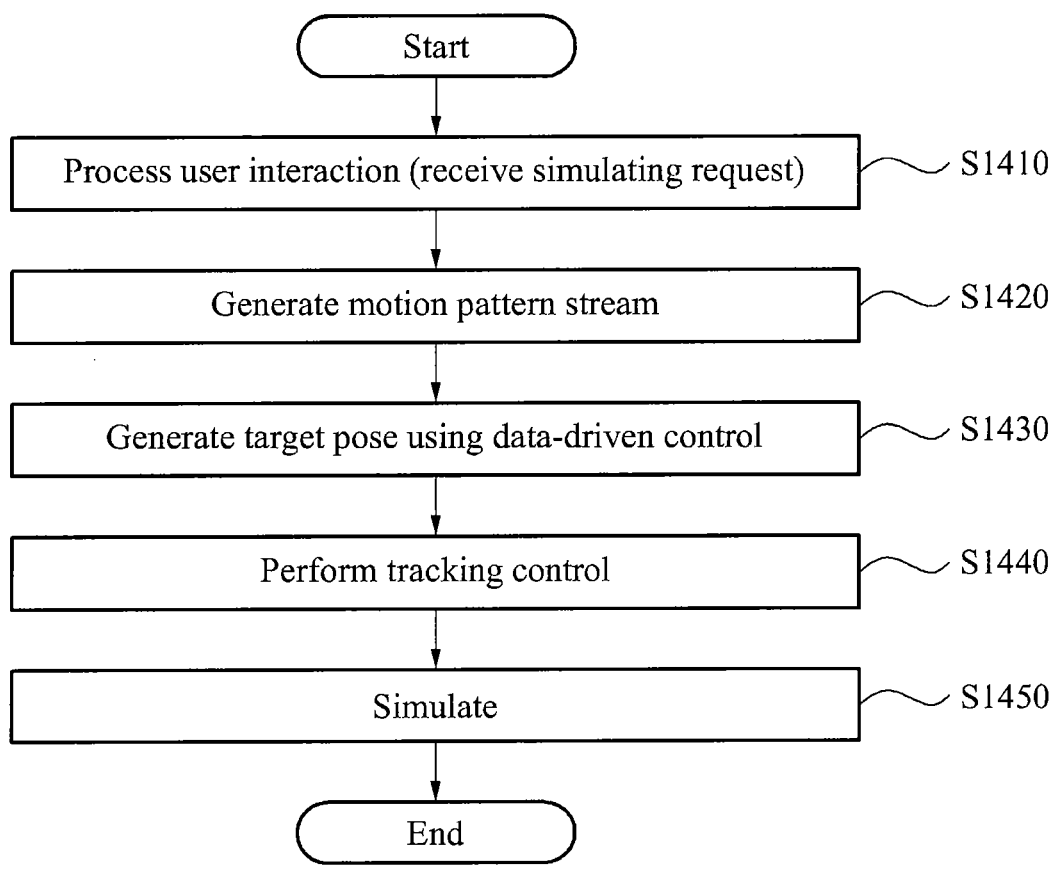
FIG. 14 is a flowchart illustrating a process of controlling and simulating a biped according to an embodiment of the present invention.

FIG. 14 is a flowchart illustrating a process of controlling and simulating a biped according to an embodiment of the present invention.

Referring to FIG. 14, when a user interaction is processed and a simulating request with respect to a biped is received in operation S1410, a motion pattern stream may be generated in operation S1420. In this instance, a necessary stream may be acquired from motion capture data, or the steam may be acquired from an animation engine to be plugged-in.

In operation S1430, the apparatus 100 of FIG. 1 may generate a target pose stream, by modulating a reference pose stream at a runtime in real time.

The operation S1430 may be identical to the detailed operations of the balancing maintenance module 110 and the synchronization module 120 described with reference to FIGS. 4 through 11.

In operation S1440, a tracking controller may perform tracking control on the target pose stream. In operation S1450, a simulator may simulate and display current post information, and current pose information of the biped simulated may be fed back. The feedback process may be identical to the description provided with reference to FIGS. 12 and 13.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A data-driven biped control apparatus comprising a processor executing program instructions recorded in a non-transitory computer-readable media operable to implement:
   a balancing maintenance module to generate target pose information for a biped by modulating reference pose information and current pose information, the reference pose information constituting reference motion data for the biped corresponding to a plurality of frame poses in a pose stream, and the current pose information corresponding to feedback of a current biped pose at runtime; and
   a synchronization module to edit a trajectory of the biped according to a time flow, wherein the synchronization module is operable to remove a frame pose from the pose stream based on the current pose information and insert a frame pose in the pose stream based on the current pose information of the biped,
   wherein removing the frame pose cuts off a portion of the trajectory of the reference pose information.

2. The apparatus of claim 1, wherein the target pose information corresponds to at least one of a stance hip, a swing hip, a stance ankle, and a swing foot height of the biped.

3. The apparatus of claim 1, wherein the balancing maintenance module computes a stance hip angle of the target pose information, by modulating a stance hip angle of the reference pose information, based on a difference between a stance hip angle of the current pose information and the stance hip angle of the reference pose information.

4. The apparatus of claim 1, wherein the balancing maintenance module computes at least one of a swing hip angle and a stance ankle angle of the target pose information, by modulating at least one of a swing hip angle and a stance ankle angle of the reference pose information, based on a difference between a velocity of a biped center of the current pose information and a velocity of a biped center of the reference pose information.

5. The apparatus of claim 1, wherein the balancing maintenance module computes at least one of a swing hip angle and a stance ankle angle of the target pose information, by modulating at least one of a swing hip angle and a stance ankle angle of the reference pose information, based on a difference between a distance from a biped center to a stance ankle of the current pose information and a distance from a biped center to a stance ankle of the reference pose information.

6. The apparatus of claim 1, wherein the balancing maintenance module computes a swing foot height of the target pose information, by modulating a swing foot height of the reference pose information, based on a difference between a swing foot height of the current pose information and the swing foot height of the reference pose information.

7. The apparatus of claim 1, wherein the balancing maintenance module computes a swing foot height of the target pose information, by modulating a swing foot height of the reference pose information, based on a difference between a change speed of a swing foot height of the current pose information and a change speed of the swing foot height of the reference pose information.

8. The apparatus of claim 1, wherein the synchronization module edits the trajectory of the reference pose information by cutting off a portion of the trajectory of the reference pose information, when a swing foot landing of the current pose information of the biped is performed earlier than a swing foot landing of the reference pose information.

9. The apparatus of claim 1, wherein the synchronization module deletes at least one frame of the reference pose information, when a swing foot landing of the current pose information of the biped is performed earlier than a swing foot landing of the reference pose information.

10. The apparatus of claim 1, wherein the synchronization module edits the trajectory of the reference pose information, by inserting a surplus trajectory into the trajectory of the reference pose information, when a swing foot landing of the current pose information of the biped is performed later than a swing foot landing of the reference pose information.

11. The apparatus of claim 1, wherein the synchronization module adds at least one frame to the reference pose information, when a swing foot landing of the current pose information of the biped is performed later than a swing foot landing of the reference pose information.

12. A data-driven biped control apparatus comprising a processor executing program instructions recorded in a non-transitory computer-readable media operable to implement:
a balancing maintenance module to generate target pose information for a biped by modulating reference pose information and current pose information, the reference pose information constituting reference motion data for the biped corresponding to a plurality of frame poses in a pose stream, and the current pose information constituting feedback of a current biped pose at runtime, and
a synchronization module to edit a trajectory of the biped according to a time flow, wherein the synchronization module is operable to remove a frame pose from the pose stream based on the current pose information and insert a frame pose in the pose stream based on the current pose information of the biped,
wherein,
the balancing maintenance module generates the target pose information by modulating the reference pose information corresponding to at least one of a stance hip, a swing hip, a stance ankle, and a swing foot height of the biped, based on the current pose information of the biped, and
wherein removing the frame pose cuts off a portion of the trajectory of the reference pose information.

13. A data-driven biped control apparatus comprising a processor executing program instructions recorded in a non-transitory computer-readable media operable to implement:
a synchronization module to edit a trajectory for a biped according to a time flow comprising reference pose information constituting reference motion data for the biped corresponding to a plurality of frame poses in a pose stream and current pose information corresponding to feedback of a current biped pose at runtime
wherein,
the synchronization module edits the trajectory of the reference pose information, by cutting off a portion of the trajectory of the reference pose information, when a swing foot landing of the current pose information of the biped is performed earlier than a swing foot landing of the reference pose information, or inserting a surplus trajectory into the trajectory of the reference pose information, when the swing foot landing of the current pose information of the biped is performed later than the swing foot landing of the reference pose information
wherein removing the frame pose cuts off a portion of the trajectory of the reference pose information.

14. A data-driven biped control method comprising:
generating, by a balancing maintenance module of a biped control apparatus, target pose information for a biped by modulating reference pose information, and current pose information, the reference pose information constituting reference motion data for the biped corresponding to a plurality of frame poses in a pose stream, and the current pose information corresponding to feedback of a current biped pose at runtime; and
editing, by a synchronization module of the biped control apparatus, a trajectory of the biped according to a time flow by:
(a) removing a frame pose from the pose stream based on the current pose information, and
(b) inserting a frame pose in the pose stream based on the current pose information of the biped,
wherein removing the frame pose cuts off a portion of the trajectory of the reference pose information.

15. The method of claim 14, wherein the target pose information corresponds to at least one of a stance hip, a swing hip, a stance ankle, and a swing foot height of the biped.

16. A non-transitory computer-readable medium comprising a program for instructing a computer to perform the method of any of claims 14 and 15.

* * * * *